(12) United States Patent
Legner (10) Patent No.: US 11,878,675 B2
(45) Date of Patent: Jan. 23, 2024

(54) METHOD FOR OPERATING A DRIVE TRAIN FOR A WORKING MACHINE, DRIVE TRAIN FOR A WORKING MACHINE, AND WORKING MACHINE

(71) Applicant: ZF Friedrichshafen AG, Friedrichshafen (DE)

(72) Inventor: Jürgen Legner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 29 days.

(21) Appl. No.: 17/441,035

(22) PCT Filed: Mar. 18, 2020

(86) PCT No.: PCT/EP2020/057382
§ 371 (c)(1),
(2) Date: Sep. 20, 2021

(87) PCT Pub. No.: WO2020/187962
PCT Pub. Date: Sep. 24, 2020

(65) Prior Publication Data
US 2022/0153255 A1    May 19, 2022

(30) Foreign Application Priority Data
Mar. 19, 2019   (DE) .......................... 102019203721.6

(51) Int. Cl.
*B60L 15/20*   (2006.01)
*B60W 10/08*   (2006.01)
(Continued)

(52) U.S. Cl.
CPC ............ *B60W 20/30* (2013.01); *B60W 10/02* (2013.01); *B60W 10/08* (2013.01);
(Continued)

(58) Field of Classification Search
CPC ...... B60W 10/02; B60W 10/08; B60W 10/10; B60W 10/113; B60W 30/19;
(Continued)

(56) References Cited

U.S. PATENT DOCUMENTS

2011/0130911 A1*   6/2011   Allgaier ................ F02N 15/022
                                                               903/902
2013/0090794 A1*   4/2013   Sung ..................... B60W 10/08
                                                               701/53
2018/0222484 A1    8/2018   Shively et al.

FOREIGN PATENT DOCUMENTS

CN          104455384 A  *  3/2015   ............. F16H 59/24
CN          104455384 A     3/2015
(Continued)

OTHER PUBLICATIONS

CN 106864308 machine translation filed Jan. 12, 2021. (Year: 2023).*

*Primary Examiner* — Tisha D Lewis
(74) *Attorney, Agent, or Firm* — Kristin L. Murphy (57) ABSTRACT

A method for operating a drive train of a working machine, wherein a traction drive of the drive train is driven by an electric traction motor via a transmission and wherein, when a gear stage of the transmission is changed, a rotational speed of the traction motor is synchronised with the gear stage being engaged. The method further includes a computational model of the traction motor that is used for the rotational speed synchronisation. The model, taking into account a moment of inertia of the traction motor, describes a torque to be delivered for the rotational speed synchronisation. A corresponding drive train and a working machine is also disclosed.

16 Claims, 3 Drawing Sheets

(51) Int. Cl.
*B60W 30/19* (2012.01)
*B60W 20/30* (2016.01)
*B60W 10/02* (2006.01)
*B60W 10/113* (2012.01)
*B60W 40/12* (2012.01)
*F16H 61/688* (2006.01)
*B60W 50/00* (2006.01)

(52) U.S. Cl.
CPC .......... *B60W 10/113* (2013.01); *B60W 30/19* (2013.01); *B60W 40/12* (2013.01); *F16H 61/688* (2013.01); *B60W 2050/0039* (2013.01); *B60W 2050/0041* (2013.01); *B60W 2300/17* (2013.01); *B60W 2510/081* (2013.01); *B60W 2510/083* (2013.01)

(58) Field of Classification Search
CPC ....... B60W 30/188; B60W 2050/0028; B60W 2050/0037; B60W 2050/0039; B60W 2050/0041; B60W 20/30; B60W 40/12; B60W 2300/17; B60W 2510/081; B60W 2510/083; B60K 2025/005; B60L 2240/421; B60L 2240/423
See application file for complete search history.

(56) References Cited

FOREIGN PATENT DOCUMENTS

| | | | | |
|---|---|---|---|---|
| CN | 106864308 A | * | 6/2017 | ............. B60L 15/20 |
| DE | 202014000738 U1 | | 4/2014 | |
| DE | 102013007354 A1 | | 10/2014 | |
| EP | 0962597 A2 | | 12/1999 | |
| JP | 2003335152 A | * | 11/2003 | ............. B60K 41/08 |

* cited by examiner

METHOD FOR OPERATING A DRIVE TRAIN FOR A WORKING MACHINE, DRIVE TRAIN FOR A WORKING MACHINE, AND WORKING MACHINE

CROSS-REFERENCE TO RELATED APPLICATION

This application is a national stage of International Application No. PCT/EP2020/057382, filed Mar. 18, 2020, the disclosure of which is incorporated herein by reference in its entirety, and which claimed priority to German Patent Application No. 102019203721.6, filed Mar. 19, 2019, the disclosure of which is incorporated herein by reference in its entirety.

TECHNICAL FIELD

The present disclosure relates to a method for operating a drive train for a working machine, to a drive train for a working machine, and to a corresponding working machine.

BACKGROUND

Electrically driven working machines, such as, for example, wheel loaders, compact loaders, telescopic handlers, dumpers or excavators, are known in the prior art. Such electrically driven working machines are either driven purely electrically, that is to say they have only an electric battery or an electric accumulator for their energy supply, or they are driven diesel-electrically, which means that the required energy is provided by a diesel-driven generator, usually in conjunction with an electric buffer store, such as, for example, a correspondingly dimensioned capacitor. In all cases, the mechanical power required for the traction drive and the working drive is generated by one or more electric motors. Furthermore, hybrid-electric working machines are also known, in which the required mechanical power is generated primarily by a combustion engine, usually a diesel engine. An electric motor which is additionally provided is fed by a battery or an accumulator and here typically performs a so-called boost function.

Power-shiftable transmissions for working machines are likewise known, in which, during a shifting operation, a speed synchronization between the speed of a drive unit and the speed of a gear stage to be engaged is carried out. In the case of an upshift operation, the speed of the drive unit is correspondingly reduced, and in the case of a downshift operation it is correspondingly increased.

In this context DE 20 2014 000 738 U1 describes a wheel loader which is driven purely electromotively, which has a first electric motor for a traction drive and a second electric motor for a working drive.

From EP 0 962 597 A2 there is known a battery-operated working machine which has two electric motors for the traction drive and a further electric motor for the working drive. The two electric motors for the traction drive are integrated into the front axle, wherein each of the two electric motors drives a wheel.

The known electrically driven working machines are, however, disadvantageous in that a speed synchronization of the gear stages involved in a shifting operation is more difficult compared to an identical operation in as working machine driven by a combustion engine. The reason for this is on the one hand the comparatively greater moment of inertia of an electric motor compared to a combustion engine, and on the other hand the comparatively greater speed spectrum of the electric motor, as a result of which there may also be correspondingly greater speed differences to be equalized. This conventionally requires a correspondingly larger and more powerful design of the clutches in electrically driven working machines, in order to avoid undesirably prolonging the synchronization operation and thus the shifting operation. However, such a comparatively larger and more powerful design of the clutch requires an increased installation space and results in an increased weight and increased production costs. Furthermore, comparatively larger clutches also have comparatively greater drag torques and friction losses.

What is needed is an improved method for operating a drive train for a working machine.

SUMMARY

A method for operating a drive train for a working machine is herein disclosed.

The disclosure relates to a method for operating a drive train of a working machine, wherein a traction drive of the drive train is driven by an electric traction motor via a traction transmission and wherein, during a gear stage change of the traction transmission, a speed synchronization of the traction motor with the gear stage to be engaged is carried out. The method according to the disclosure is distinguished by the fact that there is used for the speed synchronization a computational model of the traction motor which, while taking account of a moment of inertia of the traction motor, determines a torque to be applied for the speed synchronization.

During a gear stage change from a lower gear stage into a higher gear stage, the traction motor must reduce its speed to the speed of the higher gear stage over the temporal duration of the gear stage change, which is typically less than 1 s. Conversely, during a gear stage change from a higher into a lower gear stage, the traction motor must increase its speed to the speed of the lower gear stage. Owing to the high possible speeds of electric motors already mentioned and owing to their comparatively great moments of inertia, very high torques may here be required for a short time for the speed synchronization.

The method according to the disclosure advantageously allows the torque that is to be applied to be determined at the start of the gear stage change, before the speed synchronization is carried out. Unlike drive trains driven by combustion engines, the torque to be applied for the speed synchronization in electric drive trains can be so great that it can no longer be provided via the clutches conventionally provided alone. In order to be able to dispense with over-dimensioned, particularly powerful and thus expensive clutches in this case too, additional measures must be taken as required. Because the model determines the torque to be applied beforehand, any additional measures which may be necessary can be planned and prepared for in advance and finally carried out. The determination takes place via a computational model of the traction motor, which takes account of the traction motor and the moment of inertia thereof computationally, that is to say on the basis of mathematical formulae and physical relationships. For example, the speed synchronization can be carried out via energization of the traction motor in the forward direction or in the reverse direction, which correspondingly generates an additional torque in the forward direction or in the reverse direction.

In one exemplary arrangement, the computational model is implemented by a control unit which is configured therefor and has the necessary computational arrangement, such as a microprocessor and an electronic memory.

The model can determine the torques to be applied for the speed synchronization into the adjacent gear stage both permanently, that is to say in every operating situation, and can also determine the torque to be applied from the engaged gear stage into the gear stage to be engaged in each case only on initiation of the gear stage change.

Instead of determining the torque to be applied, the model can also determine an angular acceleration to be applied, a power to be applied or an energy to be applied. These parameters merely constitute equivalents to the determination of the torque to be applied which have the same effect and which can be calculated via known relationships according to formulae and specific characteristics of the traction motor, or of the drive train.

It is also conceivable to provide not only one electric traction motor but a plurality of electric traction motors which can be coupled with one another, for example, via a summation gear or can be separably connected in terms of drive to the traction transmission via individual drive connections.

In one exemplary arrangement, the traction transmission has a plurality of gear stages in the form of forward gears and at least one gear stage in the form of a reverse gear. In one exemplary arrangement, the number of forward gears corresponds to the number of reverse gears. Owing to the ability of electric motors to change their direction of rotation, the provision of one or more reverse gears is, however, not always necessary.

In one exemplary arrangement, all or at least some gear stages of the traction transmission are configured so as to be power-switchable. As a result, the described drive train, which is operated by the method according to the disclosure, is particularly suitable for use in a working machine.

According to one exemplary arrangement of the disclosure it is provided that the speed synchronization, in accordance with the model, is assisted by an energization of the traction motor or by a generator mode of the traction motor. That is to say, in accordance with the model, an additional torque is applied by the energization or by the generator mode. The speed synchronization which is usually effected via friction work in the clutch can thereby advantageously be assisted. The energization can take place both in the forward direction and in the reverse direction and accordingly act on the traction motor as an accelerating or braking torque. The generator mode in any case generates a braking torque.

According to a further exemplary arrangement of the disclosure, it is provided that the model takes into account a capacity for torque transmission of a clutch of the engaged gear which decreases over a duration of the gear stage change and a capacity for torque transmission of a clutch of the gear to be engaged which increases over the duration of the gear stage change. During the gear stage change, the pressure in the clutch of the engaged gear is reduced, so that its capacity for torque transmission decreases. A torque acting on the traction motor from the traction drive via the clutch of the engaged gear becomes correspondingly weaker. Conversely, the pressure in the clutch of the gear to be engaged is increased during the gear stage change, so that its capacity for torque transmission increases over the duration of the gear stage change. By taking account of these factors, the speed synchronization can be carried out more quickly and precisely and also more sensitively.

According to a further exemplary arrangement of the disclosure, it is provided that the torque to be applied is a torque curve which is specifiable by the model over the duration of the gear stage change. By describing the torque to be applied as a torque curve to be applied over the duration of the gear stage change, the gear stage change can again be carried out more sensitively and in particular more comfortably for a driver or operator of the working machine. For example, at the beginning of the gear stage change, a comparatively low torque can be applied, which increases as the gear stage change progresses and is finally reduced again at the end of the gear stage change. Abrupt jumps in the torque are thus avoided. It must only be ensured that the integrated torque curve provides the energy required overall for the speed synchronization over the entire rotational angle of the traction motor during the gear stage change.

According to one exemplary arrangement of the disclosure, it is provided that the torque curve is implemented in accordance with a specifiable speed ramp. For example, the model can determine a speed ramp whose starting speed is the speed of the engaged gear stage and whose end speed is the speed of the gear stage to be engaged. The speed ramp does not have to be linear throughout but can have linear ramp portions which descend and/or ascend more and less steeply. The speed synchronization can thus be achieved comparatively sensitively in a simple manner.

According to one exemplary arrangement of the disclosure, it is provided that an end torque of the torque curve is specified such that, when the gear stage change is complete, while taking account of a transmission ratio of the gear stage to be engaged to a transmission ratio of the engaged gear stage, the same output torque is provided at an output of the traction drive as before the gear stage change. This has the advantage that the gear stage change takes place as comfortably as possible for the driver or operator of the working machine in particular at its start and at its end.

According to another exemplary arrangement of the disclosure, it is provided that there are supplied to the model transmission speeds of the engaged gear stage and/or transmission speeds of the gear stage to be engaged and/or wheel speeds of the working machine and/or output speeds of the traction transmission and/or output torques of the traction transmission and/or a capacity for torque transmission of a clutch of an engaged gear stage and/or a capacity for torque transmission of a clutch of the gear stage to be engaged. This information can either be detected by sensor or determined mathematically, wherein it is in particular partly detected by sensor and, on the basis of the information detected by sensor, other information is determined mathematically. By supplying this information to the model and in particular as a result of this information being taken into account by the model, the model can largely optimally determine the torque to be applied, in particular the torque curve to be applied. For example, the output torque at the traction transmission can be used to specify the torque curve such that the same output torque is outputted at the traction transmission after the gear stage change as before the gear stage change.

According to a further exemplary arrangement of the disclosure it is provided that a working drive of the drive train is driven by an electric working motor via a working transmission, wherein a drive connection is established between the working drive and the traction drive, so that the traction drive is driven in a supporting manner by the drive motor. This has the advantage that additional drive power can be supplied to the traction drive from the working motor. This in turn makes possible a more compact, more lightweight and less expensive but at the same time also less powerful design of the traction motor. The less powerful design of the traction motor does not necessarily result in a disadvantage, however, since the traction drive can be driven in a supporting manner by the working motor if required. The combined power of the drive motor and of the working motor is thus available for the traction drive, where required. The more compact and more lightweight design, on the other hand, has the further advantage that the moment of inertia of the traction motor can be reduced significantly. The moment of inertia of a substantially cylindrical electric motor is affected by the square of its cylinder radius, and for this reason even a small reduction in overall size leads to a comparatively large reduction in the moment of inertia. This in turn simplifies the speed synchronization during gear stage changes. If a speed synchronization of the working motor is also necessary, the working motor and its characteristics, also its moment of inertia, may also taken into account by the model.

According to one exemplary arrangement of the disclosure it is provided that the traction drive is driven in a supporting manner by the working motor whenever it is thereby possible to achieve an improvement in the overall efficiency of the drive train compared to when the traction drive is driven solely by the traction motor. This makes it possible to reduce the energy requirement of the working machine overall and thus to prolong its operating time before a charging operation becomes necessary. This in turn means a reduction in $CO_2$ emissions, since a certain proportion of the electricity for a charging operation is typically still generated by the burning of fossil fuels. A further advantage can be seen in that the loading of the traction motor can be reduced, since it is operated in a high-load mode less frequently. Conversely, although the working motor is more highly loaded, operating both the traction motor and the working motor in a middle load range involves significantly less wear overall than a high-load mode of the traction motor alone.

According to a further exemplary arrangement of the disclosure, it is provided that the traction drive is not driven by the working motor, however, if the working motor must provide more than a threshold working power required by the working drive. It is thus ensured that the working drive can always reliably be provided with the mechanical power required for operation thereof. It is thus possible to avoid a sudden power drop, in particular a power drop that is unexpected for the operator of the working machine. Such an unexpected power drop could otherwise result in a dangerous situation, for example if a lifting apparatus of the working machine that is operated by the working drive no longer receives the necessary working power to hold a lifted load.

The threshold power can, for example, be specified in a fixed manner and be, for example, 15% of the maximum power of the working motor. However, in one exemplary arrangement, the threshold power is dependent on operating parameters of the working drive, for example on the speed and torque of a hydraulic pump of the working drive.

It is important that the requirement for working power of the working drive is met fully by the working motor in particular when comparatively high power requirements are made both by the traction drive and by the working drive which can no longer be provided in total by the working motor. Thus, at the latest when the required total power exceeds the maximum power that can be provided by the working motor, the requirement of the working drive is first met in full. A remaining residual power of the working motor which can still be provided can then be made available to the traction drive.

However, it is provided that the working motor drives the working drive at all times at least inasmuch as the supply of pressure oil to the clutches of the traction transmission and of the working transmission and a supply of lubricating oil to the traction transmission and the working transmission are ensured. For this purpose, in one exemplary arrangement, the working motor is coupled with the corresponding pumps via a rigid, non-separable mechanical drive connection.

According to a further exemplary arrangement, of the disclosure, it is provided that the working drive comprises a hydraulic pump which can be driven by the working motor and has an adjustable piston stroke height, wherein the piston stroke height is first increased and only then is a speed of the working motor increased in order to provide the working power required by the working drive. This is particularly advantageously suitable if the hydraulic pump is in the form of a so-called variable axial piston pump. The stroke volume of the hydraulic pump can be controlled or regulated via the piston stroke height. An increase in the piston stroke height leads to the generation of a comparatively high hydraulic power, while a small piston height correspondingly leads to a comparatively low hydraulic power. The pump usually exhibits its maximum efficiency when its maximum piston stroke height is set. In addition to the greatest possible efficiency, this has the further advantage that a speed of the hydraulic pump corresponding to the variable pump piston height can be decoupled from the speed of the working motor.

In one exemplary arrangement, a piston stroke height is adapted to the required working power such that the working motor and the hydraulic pump together have the greatest possible efficiency. That is to say, in order to achieve a specific operating point of the working drive, a combination of speed and piston stroke height of the pump is thus selected such that the working drive provides the required working power with the greatest possible joint efficiency. The efficiencies of the working motor and of the pump can be read out, for example, from a characteristic curve or table stored electronically in a memory.

The disclosure relates further to a drive train for a working machine, comprising a traction drive having an electric traction motor and a traction transmission and also a working drive having an electric working motor and a working transmission, wherein the traction drive can be driven by the traction motor via the traction transmission and wherein the working drive can be driven by the working motor via the working transmission, and wherein, during a gear stage change of the traction transmission, a speed synchronization of the traction motor with the gear stage to be engaged is carried out. The drive train according to the disclosure is distinguished by the fact that the drive train further comprises an electronic control unit which is configured to calculate a computational model of the drive motor which, while taking account of a moment of inertia of the drive motor, determines a torque to be applied for the speed synchronization. The drive train according to the disclosure accordingly advantageously comprises all the necessary devices to be able to implement the method according to the disclosure. This in turn results in the advantages already described in connection with the method according to the disclosure.

In one exemplary arrangement, the drive train further comprises, for controlling or regulating the speed or torque of or of the power to be supplied by the traction motor and the working motor, in each case an own power electronics or a single common power electronics. Likewise preferably, the drive train comprises an electronic motor control unit which controls or regulates the traction motor and the working motor via the respective own power electronics or via the common power electronics. The motor control unit can be identical to the control unit that calculates the model and/or structurally and functionally integrated therein.

The traction transmission and/or the working transmission can be either of the planetary type or of the countershaft type and can have both spur gear stages and any other forms of transmission.

In one exemplary arrangement, the traction transmission is configured so as to be power-shiftable over all gear stages.

In one exemplary arrangement, the working transmission is configured so as to be shiftable over all gear stages, in particular also power-shiftable.

According to one exemplary arrangement of the disclosure it is provided that the drive train comprises a connecting clutch via which a drive connection can be established between the traction drive and the working drive. This advantageously allows the working motor to support the traction drive at least in selected situations. Conversely, however, it is also conceivable that the working drive is supported by the traction motor in selected situations via the drive connection.

According to one exemplary arrangement of the disclosure it is provided that the drive connection leads from the working drive to an input of the traction transmission. This has the advantage that the working motor can drive the traction drive in a supporting manner in all gear stages of the traction drive.

In one exemplary arrangement, the working motor and/or the traction motor are configured to recover kinetic energy in braking operation of the working machine. Due to the drive connection which can be established between the working drive and the traction drive via the connecting clutch, kinetic energy can advantageously be recovered both by the working motor and by the traction motor. For this purpose, the drive train further advantageously comprises an electrical energy store, to which the electrical energy supplied by the recovery operation can be supplied. In recovery operation, the working motor and/or the traction motor work as generators and convert mechanical, namely kinetic, energy into electrical energy. This electrical energy can later be drawn from the electrical energy store again if required, in order to supply the working motor or the traction motor. In addition, it can also be provided that the electrical energy store can be charged with external electrical energy via a charging cable or other suitable charging device, for example an inductive charging device. The use of the working motor and/or the traction motor for the recovery additionally reduces the wear of a mechanical friction brake, since a braking torque is active during the recovery.

According to an exemplary arrangement of the disclosure it is provided that the drive train is configured to implement a method according to the disclosure.

The disclosure relates further to a working machine comprising a drive train according to the disclosure. The advantages already described in connection with the drive train according to the disclosure are also obtained for the working machine according to the disclosure.

According to a further exemplary arrangement of the disclosure it is provided that the working machine is in the form of a wheel loader, dumper, excavator, telescopic handler or tractor.

BRIEF DESCRIPTION OF THE DRAWINGS

The disclosure will be explained by way of example hereinbelow with reference to exemplary arrangements shown in the figures.

DETAILED DESCRIPTION

Identical objects, functional units and comparable components are designated with the same reference numerals throughout the figures. These objects, functional units and comparable components are identical in form in terms of their technical features, unless explicitly or implicitly apparent otherwise from the description.

Figure 1:
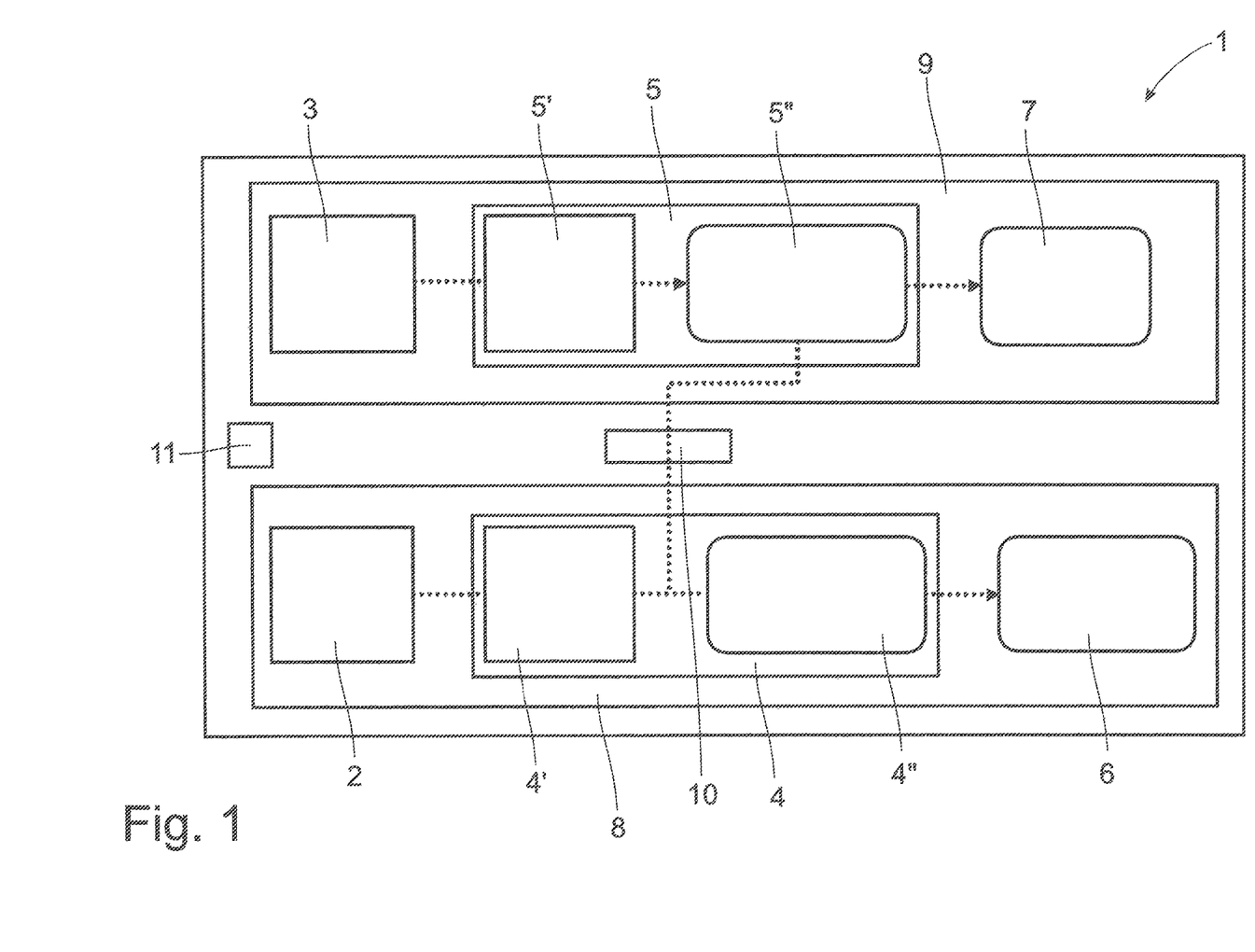
FIG. 1 shows, by way of example and schematically, a possible exemplary arrangement of a drive train according to the disclosure.

FIG. 1 shows, by way of example and schematically, a possible exemplary arrangement of a drive train 1 according to the disclosure for a working machine, not shown in FIG. 1. The drive train 1 shown by way of example comprises an electric traction motor 2 and an electric working motor 3 and also a traction transmission 4 and a working transmission 5. Both the traction transmission 4 and the working transmission 5 each have a reduction stage 4', 5' for reducing an output speed of the working motor 3 or of the traction motor 2, respectively. The traction transmission 4 further has a power-shift part 4" which according to the example is power-shiftable over three gear stages.

The working transmission 5, on the other hand, has only a single power-shiftable clutch 5". An output speed of the traction transmission 4 is provided at an output shaft 6. An output speed of the working transmission 5 is provided at a power takeoff shaft 7. The traction motor 2, the traction transmission 4 and the output shaft 6 are associated according to the example with a traction drive 8 of the drive train 1, whereas the working motor 3, the working transmission 5 and the power takeoff shaft 7 are associated according to the example with a working drive 9 of the drive train 1.

The power flow directions in the working drive 9 and in the traction drive 8 are each represented by broken arrows. A drive connection can additionally be established between the working drive 9 and the traction drive 8 via a connecting clutch 10.

As can be seen, the drive connection runs from the power-shiftable clutch 5" via the connecting clutch 10 to the traction transmission 4, namely to the input of the power-shift part 4". It is thus possible to drive all the gear stages of the traction drive 8 in a supporting manner by the working drive 9. During a gear stage change of the traction transmission 8, a speed synchronization of the traction motor 2 must be carried out in order to match the speed of the traction motor 2 from the speed of the currently engaged gear stage to the speed of the gear stage to be engaged.

Since the traction motor 2 is in the form of an electric motor and electric motors have a comparatively high moment of inertia, a computational model of the traction motor 2 is used for the speed synchronization of the traction motor 2, wherein the model takes into account in particular the moment of inertia of the traction motor 2. Via the model it is possible to determine the magnitude of a moment that is necessarily to be applied for the speed synchronization and for what period of time it must be applied, and whether this torque can be generated solely by friction in the power-shift part 4" or whether the application of an additional torque by energization or a generator mode of the traction motor 2 may be necessary. The drive train 1 therefore further also comprises an electronic control unit 11, which is configured to calculate the model.

Figure 2:
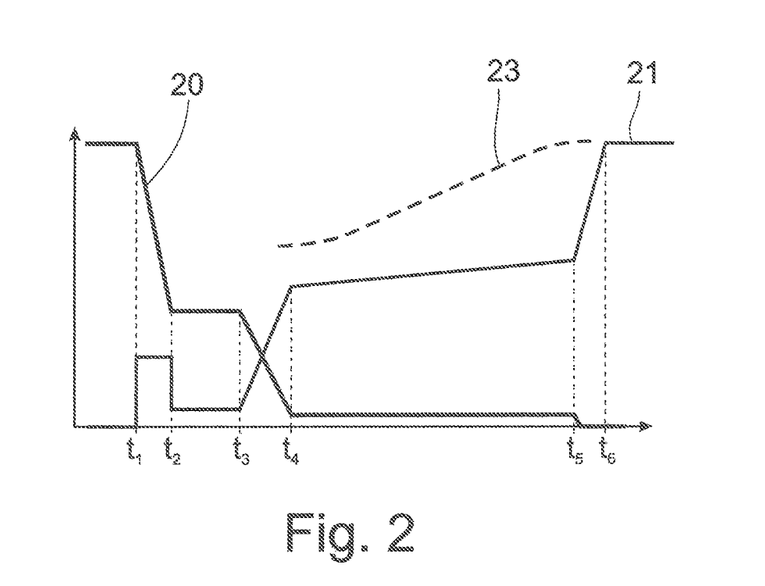
FIG. 2 shows, by way of example and schematically, a gear stage change in the traction drive of the drive train according to the disclosure.

FIG. 2 shows, by way of example and schematically, a gear stage change in the traction drive 8 of the drive train 1 according to the disclosure by the method according to the disclosure. According to the example, the gear stage change is from an engaged, higher gear stage to a lower gear stage that is to be engaged in coasting mode of the working machine. There are thereby shown in the form of a coordinate system a pressure curve 20 in a clutch of an engaged gear stage and a pressure curve 21 in a clutch of a gear stage to be engaged. A speed curve 23 of the traction motor 2 can likewise be seen. The x-axis in FIG. 2 shows the pressure in the clutches and the speed of the traction motor 2. The y-axis shows the time.

As can be seen, at the beginning of the gear stage change the pressure in the clutch of the engaged gear stage is initially at the fill pressure. The pressure in the clutch of the gear stage to be engaged, on the other hand, is initially zero. At time $t_1$, the pressure in the clutch of the engaged gear stage is reduced in a ramp-like manner, so that the capacity for torque transmission between the clutch of the engaged gear stage and the traction motor 2 decreases. At the same time, the pressure in the clutch of the gear stage to be engaged is increased abruptly, whereby the capacity for torque transmission between the clutch of the gear stage to be engaged and the traction motor 2 increases abruptly. At time $t_2$, the ramp-like pressure drop in the clutch of the engaged gear stage is stopped. The pressure in the clutch of the engaged gear stage is then kept constant to time $t_3$. In the clutch of the gear stage to be engaged, on the other hand, the pressure is reduced again at time $t_2$ and maintained at a constant level to time $t_3$. This serves the purpose of fill compensation in the clutch of the gear stage to be engaged. From time $t_3$, the pressure in the clutch of the gear stage to be engaged is then increased in a ramp-like manner and the pressure in the clutch of the engaged gear stage is reduced further in a ramp-like manner, so that at time $t_4$ the pressure in the clutch of the gear stage to be engaged is greater than the pressure in the clutch of the engaged gear stage. Accordingly, at time $t_4$, the capacity for torque transmission of the clutch of the gear stage to be engaged is greater than the capacity for torque transmission of the clutch of the engaged gear stage.

The speed curve 23 of the traction motor 2 was constant up to time $t_4$. However, since the capacity for torque transmission of the clutch of the gear stage to be engaged is now greater than the capacity for torque transmission of the clutch of the engaged gear stage, the speed synchronization of the traction motor 2 begins here. The speed of the traction motor 2 already increases solely due to friction with the clutch of the gear stage to be engaged.

Since, according to the example, there is used for the speed synchronization a computational model of the traction motor 2 which, while taking account of a moment of inertia of the traction motor 2, determines a torque to be applied for the speed synchronization, it is recognized according to the example that it is not possible to apply sufficient torque for the speed synchronization via friction alone.

Accordingly, according to the example, energization of the traction motor 2 in the forward direction additionally takes place from time $t_4$, in order to accelerate the speed synchronization by the additional torque and be able to complete it within the necessary time. The pressure in the clutch of the gear stage to be engaged is then slowly increased further in a ramp-like manner to time $t_5$, whereby the friction between the clutch of the gear stage to be engaged and the traction motor 2 also increases further, which consequently correspondingly effects an increase in the applied torque for the speed synchronization. Therefore, according to the example, the torque additionally applied by energization is reduced to the same extent as the torque generated by friction with the clutch of the gear stage to be engaged increases. A uniform equalization of the speed, or a comparatively gentle increase in the speed until the end speed is reached thus takes place. The pressure in the clutch of the engaged gear stage, on the other hand, is kept constant from time $t_4$. At time $t_5$, the speed synchronization is complete according to the example. The traction motor 2 has reached its end speed. The pressure in the clutch of the engaged gear stage is then reduced to zero and the pressure in the clutch of the gear stage to be engaged is increased to the fill pressure. At time $t_6$, the gear stage change is complete.

Figure 3:
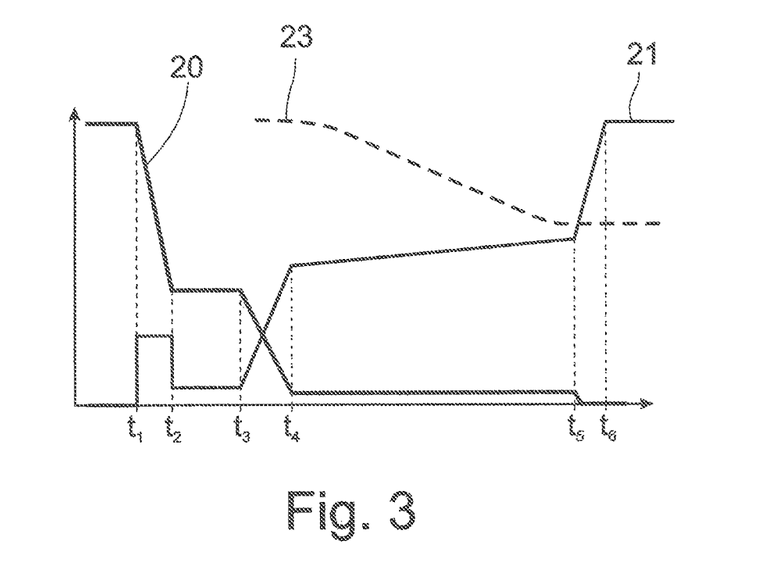
FIG. 3 shows, by way of example and schematically, a further gear stage change in the traction drive of the drive train according to the disclosure.

FIG. 3 shows, by way of example and schematically, a further gear stage change in the traction drive 8 of the drive train 1 according to the disclosure by the method according to the disclosure. In contrast to the gear stage change shown in FIG. 2, however, FIG. 3 shows a gear stage change from an engaged, lower gear stage to a higher gear stage to be engaged in traction mode of the working machine. The pressure curve in the clutch of the gear stage to be engaged 21 and the pressure curve in the clutch of the engaged gear stage 20 are unchanged from the illustration of FIG. 2. Only the speed curve 23 of the traction motor 2 differs from the speed curve 23 of FIG. 2 in that, in FIG. 3, a speed synchronization in the form of a speed reduction is carried out.

According to the example, the speed synchronization is again also carried out in FIG. 3 using the computational model of the traction motor 2 which, while taking account of the moment of inertia of the traction motor 2, determines a torque to be applied for the speed synchronization. In this case too, it is recognized according to the example that sufficient torque for the speed synchronization cannot be applied via friction in the clutch of the gear stage to be engaged alone. The start of the speed synchronization again begins at time $t_4$.

In order to assist with the speed synchronization, energization of the traction motor 2 also takes place according to FIG. 3, but this time in the reverse direction, since a speed reduction is necessary for the speed synchronization. The speed of the traction motor 2 falls correspondingly until the speed synchronization is complete at time $t_5$.

Figure 4:
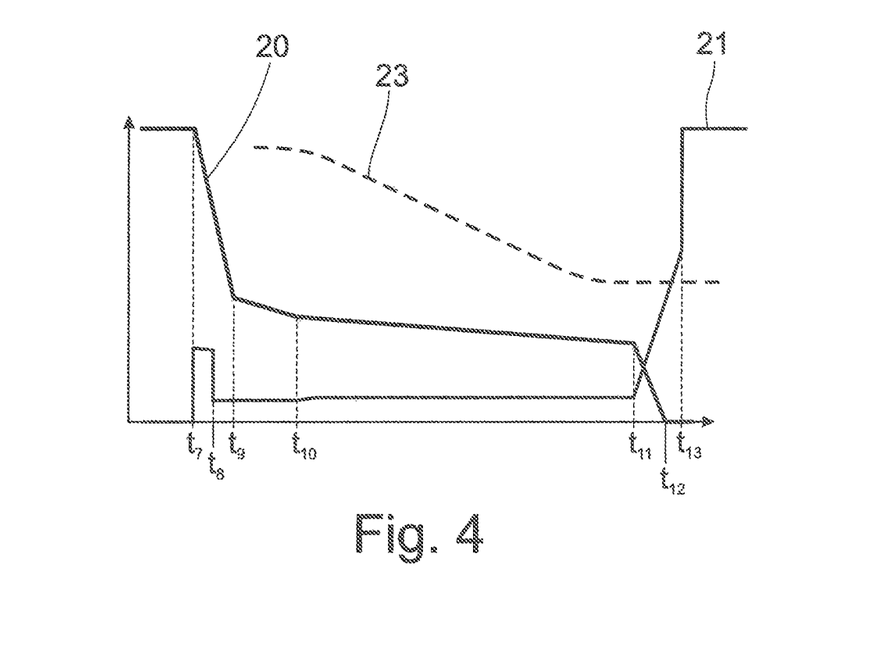
FIG. 4 shows, by way of example and schematically, a further gear stage change in the traction drive of the drive train according to the disclosure.

FIG. 4 shows, by way of example and schematically, a further gear stage change in the traction drive 8 of the drive train 1 according to the disclosure by the method according to the disclosure. FIG. 4 shows a gear stage change from an engaged, lower gear stage to a higher gear stage to be engaged in coasting mode of the working machine.

FIG. 4 shows the speed curve 23 of the traction motor 2, the pressure curve 20 in the clutch of the engaged gear stage, and the pressure curve 21 in the clutch of the gear stage to be engaged. As can be seen, the pressure in the clutch of the engaged gear stage is here too initially at the fill pressure at the start of the gear stage change. The pressure in the clutch of the gear stage to be engaged, on the other hand, is initially again zero. At time $t_7$, the pressure in the clutch of the engaged gear stage is reduced in a ramp-like manner, so that the capacity for torque transmission between the clutch of the engaged gear stage and the traction motor 2 decreases. At the same time, the pressure in the clutch of the gear stage to be engaged is increased abruptly, whereby the capacity for torque transmission between the clutch of the gear stage to be engaged and the traction motor 2 correspondingly also increases.

The pressure in the clutch of the gear stage to be engaged is kept constant until time $t_8$, then it is abruptly partially reduced again in order to effect fill compensation. The ramp-like pressure reduction in the clutch of the engaged gear stage is continued to time $t_9$. During this time, the pressure in the clutch of the gear stage to be engaged is kept at a constant level to time $t_{10}$. From time $t_9$ to time $t_{10}$, the ramp-like pressure reduction in the clutch of the engaged gear stage is continued, but slowed down. At time $t_{10}$, on the one hand the pressure reduction in the clutch of the engaged gear stage is slowed further and on the other hand the pressure in the clutch of the gear stage to be engaged is increased slightly and then kept constant. From time $t_{10}$, the speed synchronization of the traction motor 2 also takes place in the form of a speed reduction. According to the example, the speed synchronization is again also carried out in FIG. 4 using the computational model of the traction motor 2 which, while taking account of the moment of inertia of the traction motor 2, determines a torque to be applied for the speed synchronization. In this case too, it is recognized according to the example that sufficient torque for the speed synchronization cannot be applied via friction alone. The speed synchronization is therefore effected both by a torque applied by a friction between the traction motor 2 and the clutch of the gear stage to be engaged and by a torque applied by energization of the traction motor 2.

Energization of the traction motor 2 thereby takes place in the reverse direction, in order to accelerate the necessary speed reduction. At time the speed synchronization is complete and a ramp-like rise in the pressure in the clutch of the gear stage to be engaged and, at the same time, a ramp-like fall in the pressure in the clutch of the engaged gear stage take place. Since the pressure in the clutch of the gear stage to be engaged now exceeds the pressure in the clutch of the engaged gear stage, the capacity for torque transmission of the clutch of the gear stage to be engaged also exceeds the capacity for torque transmission of the clutch of the engaged gear stage.

At time $t_{12}$, the pressure in the clutch of the engaged gear stage is finally reduced to zero and at time $t_{13}$ the pressure in the clutch of the engaged gear stage is ultimately increased abruptly to the fill pressure. The gear stage change is thus complete.

Figure 5:
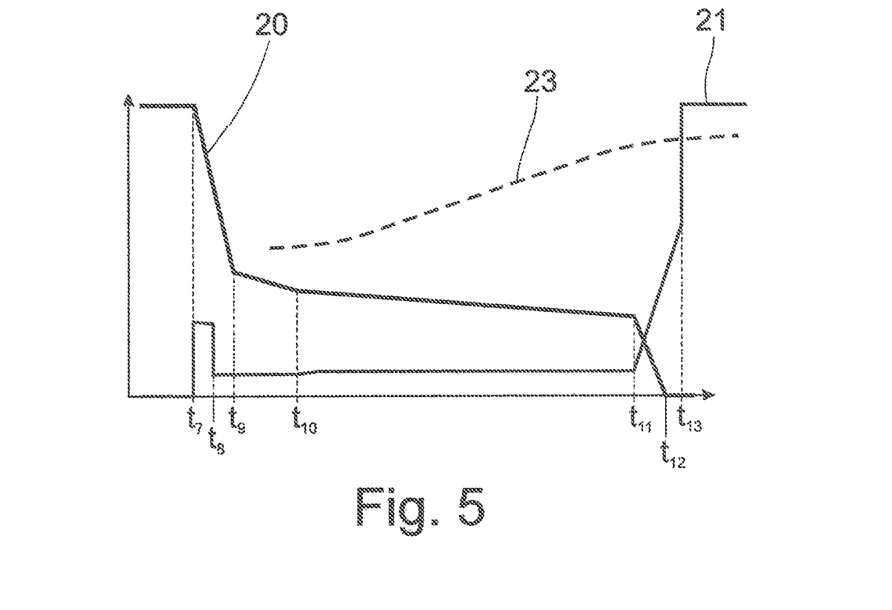
FIG. 5 shows, by way of example and schematically, a further gear stage change in the traction drive of the drive train according to the disclosure.

FIG. 5 shows, by way of example and schematically, a further gear stage change in the traction drive 8 of the drive train 1 according to the disclosure by the method according to the disclosure. In contrast to the gear stage change shown in FIG. 4, however, FIG. 5 shows a gear stage change from an engaged, higher gear stage to a lower gear stage to be engaged in traction mode of the working machine. The pressure curve in the clutch of the gear stage to be engaged 21 and the pressure curve in the clutch of the engaged gear stage 20 are thereby unchanged from the illustration of FIG. 4. Only the speed curve 23 of the traction motor 2 differs from the speed curve 23 of FIG. 4 in that, in FIG. 5, a speed synchronization in the form of a speed increase is carried out.

According to the example, the speed synchronization is also carried out in FIG. 5 using the computational model of the traction motor 2 which, while taking account of the moment of inertia of the traction motor 2, determines a torque to be applied for the speed synchronization. According to the example, in accordance with the model, an additional torque is therefore applied via an energization of the traction motor 2 in the forward direction. The beginning of the speed synchronization again starts at time $t_{10}$. The speed of the traction motor 2 correspondingly increases until the speed synchronization is complete at time $t_{11}$.

The invention claimed is:

1. A method for operating a drive train of a working machine, comprising: driving a traction drive of the drive train a traction motor via a traction transmission and wherein, during a gear stage change of the traction transmission, synchronizing a speed of the traction motor with a gear stage to be engaged, wherein a computational model of the traction motor is used for synchronizing the speed, while taking account of a moment of inertia of the traction motor, to determine any additional torque to be applied by a friction between the traction motor and a clutch of the gear stage for synchronizing the speed; and wherein a working drive of the drive train is driven by an electric working motor via a working transmission, the method further comprising establishing a drive connection between the working drive and the traction drive so that the traction drive is driven in a supporting manner by the working motor; and driving the traction drive in a supporting manner by the working motor whenever it is thereby possible to achieve an improvement in an overall efficiency of the drive train compared to when the traction drive is driven solely by the traction motor.

2. The method as claimed in claim 1, wherein the speed synchronization is assisted, in accordance with the model, by an energization of the traction motor.

3. The method as claimed in claim 1, wherein the model takes into account a capacity for torque transmission of a clutch of the engaged gear which decreases over a duration of the gear stage change and a capacity for torque transmission of a clutch of the gear to be engaged which increases over the duration of the gear stage change.

4. The method as claimed in claim 1 wherein the torque to be applied is a torque curve which is specifiable by the model over the duration of the gear stage change.

5. The method as claimed in claim 4, wherein the torque curve is implemented in accordance with a specifiable speed ramp.

6. The method as claimed in claim 4 wherein an end torque of the torque curve is specified such that, when the gear stage change is complete, while taking account of a transmission ratio of the gear stage to be engaged to a transmission ratio of the engaged gear stage, the same output torque is provided at an output of the traction transmission as before the gear stage change.

7. The method as claimed in claim 1 wherein there are supplied to the model transmission speeds of the engaged gear stage and/or transmission speeds of the gear stage to be engaged and/or wheel speeds of the working machine and/or output speeds of the traction transmission and/or output torques of the traction transmission and/or a capacity for torque transmission of a clutch of an engaged gear stage and/or a capacity for torque transmission of a clutch of the gear stage to be engaged.

8. The method as claimed in claim 1, wherein the traction drive is not driven by the working motor, however, if the working motor must provide more than a threshold working power required by the working drive.

9. The method as claimed in claim 8, wherein the working drive comprises a hydraulic pump which can be driven by the working motor and has an adjustable piston stroke height, wherein the piston stroke height is first increased and only then is a speed of the working motor increased in order to provide the working power required by the working drive.

10. A drive train for a working machine, comprising a traction drive having an electric traction motor and a traction transmission, and a working drive having an electric working motor and a working transmission, wherein the traction drive can be driven by the traction motor via the traction transmission and wherein the working drive can be driven by the working motor via the working transmission, and wherein, during a gear stage change of the traction transmission, a speed synchronization of the traction motor with the gear stage to be engaged is carried out, wherein the drive train further comprises a connecting clutch via which a drive connection can be established between the traction drive and the working drive and an electronic control unit which is configured to calculate a computational model of the traction motor which, while taking account of a moment of inertia of the traction motor, determines a torque to be applied by friction between the traction motor and a clutch of the gear stage for the speed synchronization; and wherein a drive connection between the working drive and the traction drive is provided such that the traction drive is selectively driven in a supporting manner by the working motor whenever it is thereby possible to achieve an improvement in an overall efficiency of the drive train compared to when the traction drive is driven solely by the traction motor.

11. The drive train as claimed in claim 10, wherein the drive connection leads from the working drive to an input of the traction transmission.

12. A working machine comprising a drive train as claimed in claim 10.

13. The method as claimed in claim 1, wherein the speed synchronization is assisted, in accordance with the model, by a generator mode of the traction motor.

14. The method as claimed in claim 2, wherein the model takes into account a capacity for torque transmission of a clutch of the engaged gear which decreases over a duration of the gear stage change and a capacity for torque transmission of a clutch of the gear to be engaged which increases over the duration of the gear stage change.

15. The method as claimed in claim 3, wherein the torque to be applied is a torque curve which is specifiable by the model over the duration of the gear stage change.

16. The method as claimed in claim 5, wherein an end torque of the torque curve is specified such that, when the gear stage change is complete, while taking account of a transmission ratio of the gear stage to be engaged to a transmission ratio of the engaged gear stage, the same output torque is provided at an output of the traction transmission as before the gear stage change.

* * * * *